United States Patent
Narita (10) Patent No.: US 8,189,251 B2
(45) Date of Patent: May 29, 2012

(54) OPTICAL SCANNER AND IMAGE FORMING APPARATUS INCLUDING THE SAME

(75) Inventor: Susumu Narita, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 666 days.

(21) Appl. No.: 12/332,918

(22) Filed: Dec. 11, 2008

(65) Prior Publication Data

US 2009/0168133 A1 Jul. 2, 2009

(30) Foreign Application Priority Data

Dec. 27, 2007 (JP) ................. 2007-336477

(51) Int. Cl.
*G02B 26/08* (2006.01)
*G02B 26/10* (2006.01)
*G02B 26/12* (2006.01)

(52) U.S. Cl. .................................. 359/205.1

(58) Field of Classification Search .... 359/196.1–226.3; 347/256–257, 260–261
See application file for complete search history.

(56) References Cited

U.S. PATENT DOCUMENTS 5,543,829 A * 8/1996 Fisli .............................. 347/241
2006/0103906 A1* 5/2006 Sato et al. .................... 359/205

FOREIGN PATENT DOCUMENTS

| JP | 08-146325 | | 6/1996 |
| JP | 2003270573 A | * | 9/2003 |
| JP | 2005-265904 | | 9/2005 |
| JP | 2006-017881 | | 1/2006 |

OTHER PUBLICATIONS

Machine translation of JP 2006-017881 A (cited in IDS of Dec. 11, 2008).*

* cited by examiner

*Primary Examiner* — Stephone Allen
*Assistant Examiner* — Kimberly N Kakalec
(74) *Attorney, Agent, or Firm* — Dickstein Shapiro LLP (57) ABSTRACT

An optical scanner provided with at least one optical path through which an optical beam emitted from a light source is directed onto a surface of an object for forming an image thereon includes a deflector configured to deflect the optical beam and a curvature adjustment unit. The curvature adjustment unit includes a reflecting mirror configured to reflect the optical beam in a predetermined direction, a holder unit configured to hold the reflecting mirror and including at least one supporter that engages the reflecting mirror, a pressure unit configured to flexibly deform the reflecting mirror in a normal direction relative to a reflecting surface of the reflecting mirror, and a fixing member fixed to at least a portion of the reflecting mirror, configured to fix a position of the holder unit relative to the reflecting mirror in a main scanning direction by contacting at least a portion of the holder unit including the supporter.

9 Claims, 10 Drawing Sheets

OPTICAL SCANNER AND IMAGE FORMING APPARATUS INCLUDING THE SAME

CROSS-REFERENCE TO RELATED APPLICATIONS

This patent specification claims priority from Japanese Patent Application No. 2007-336477, filed on Dec. 27, 2007 in the Japan Patent Office, the entire contents of which are hereby incorporated by reference herein.

BACKGROUND OF THE INVENTION

1. Field of the Invention

The present invention generally relates to an optical scanner and an image forming apparatus, such as a laser printer, a digital copier, a laser facsimile machine, etc., that includes the optical scanner.

2. Discussion of the Background Art

In general, an electronographic image forming apparatus, for example, a digital copier, a laser printer, a facsimile machine, etc., that forms an image on a sheet of recording media includes an optical scanner (hereinafter also "optical writing unit") configured to direct an optical beam emitted from a light source onto a surface of an image carrier according to image information, forming an electrostatic latent image thereon. Then, the electrostatic latent image is developed with toner, transferred from the image carrier onto the sheet, and fixed thereon.

The optical writing unit generally includes a polygon mirror that deflects the optical beam while rotating, multiple optical devices, such as an f-theta (θ) lens, a scanning lens, reflecting mirrors, etc., that direct the deflected optical beam onto the surface of the image carrier, and an optical detector configured to determine a writing start point. The optical detector is located on a side where scanning begins, outside an effective exposure area.

In such an image forming apparatus, a line of the optical beam scanning across the surface of the image carrier (hereinafter "scanning line") tends to curve. That is, the image forming apparatus includes devices, such as a motor for driving the polygon mirror, that generate heat and can cause the optical devices to deform thermally. Such thermal deformation, curvature of imaging surfaces of the optical devices, assembly error, installation error of the image carrier, etc., can cause the main scanning line to curve.

Particularly, in multicolor image forming, in which different single-color images are superimposed one on another, if each of multiple scanning lines curves differently from the other, the final image will have color deviation, that is, the superimposed single-color images are not aligned with each other in the multicolor image.

In order to reduce curvature of the scanning line (hereinafter "scanning line curvature"), several approaches involving curving the reflecting mirror that is an optical device have been suggested.

In one known method, multiple reflecting mirrors configured to reflect an optical beam are disposed in an optical path, and the reflecting mirror that is closest to the surface to be scanned by the optical beam has a surface concave or convex in a normal direction so as to correct the scanning line curvature on the scan to be scanned.

In another known method, a reflecting mirror disposed in an optical path is deformed in a normal direction with respect to a reflecting surface thereof so as to correct the scanning line curvature.

However, the methods described above do not disclose a means nor technique to regulate the relative positions of the reflecting mirror and a holder holding the reflecting mirror so as to maintain the corrected scanning line.

For example, even if the reflecting mirrors are adjusted with each other preliminarily so as to align the scanning line curvature among them, the reflecting mirrors can be misaligned if the optical writing unit receives physical or thermal impact at a user's site, or is shaken during transport. In such a case, adjustment of the scanning lines can be disturbed.

Therefore, it is necessary to maintain the adjusted scanning lines after the scanning lines are adjusted during initial adjustment or factory adjustment.

SUMMARY OF THE INVENTION

In view of the foregoing, one illustrative embodiment of the present invention provides a curvature adjustment unit used in an optical scanner for forming an image on a surface of an object with an optical beam emitted from a light source. The curvature adjustment unit includes a reflecting mirror configured to reflect the optical beam deflected by the deflector in a predetermined direction, a holder unit configured to hold the reflecting mirror and including at least one supporter that engages the reflecting mirror, a pressure unit configured to flexibly deform the reflecting mirror in a normal direction relative to a reflecting surface of the reflecting mirror, and a fixing member fixed to at least a portion of the reflecting mirror, configured to fix a position of the holder unit relative to the reflecting mirror in a main scanning direction by contacting at least a portion of the holder unit including the supporter.

In another illustrative embodiment of the present invention, an optical scanner is provided with at least one optical path through which an optical beam emitted from a light source is directed onto a surface of an object for forming an image thereon. The optical scanner includes a deflector configured to deflect the optical beam and the curvature adjustment unit described above.

Yet in another illustrative embodiment of the present invention, an image forming apparatus includes at least one image carrier on which a latent image is formed and the optical scanner described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Figure 1:
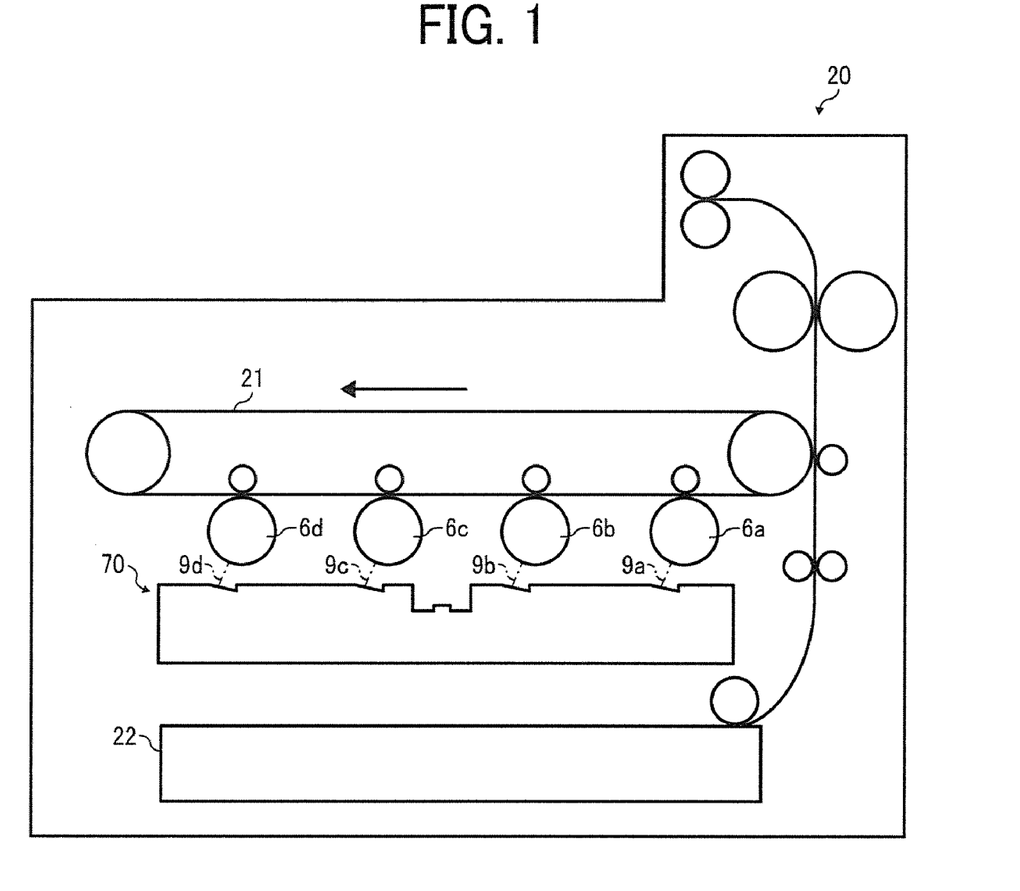
FIG. 1 is a schematic cross-sectional view illustrating an example of an image forming apparatus according to an illustrative embodiment of the present invention.

Referring now to the drawings, wherein like reference numerals designate identical or corresponding parts throughout the several views thereof, and particularly to FIG. 1, an image forming apparatus according to an illustrative embodiment of the present invention is described.

FIG. 1 is a schematic cross-sectional view illustrating an image forming apparatus 20 that in the present embodiment is a digital color copier.

Referring to FIG. 1, the image forming apparatus 20 includes a sheet container 22 containing sheets of recording media, such as paper, overhead projector (OHP) films, etc., image forming units, an optical writing unit 70 serves as an optical scanner, and an intermediate transfer belt 21 that is rotatable in a direction indicated by an arrow. The image forming units includes photoreceptors 6a, 6b, 6c, and 6d serving as image carriers, chargers, developing units, photoreceptor cleaners, and dischargers, and form different color images, for example, yellow, cyan, magenta, and black images, respectively. The optical writing unit 70 includes light sources that emit laser beams 9a, 9b, 9c, and 9d onto the photoreceptors 6a, 6b, 6c, and 6d, respectively, corresponding to the color of images formed thereon.

It is to be noted that the components indicated by an identical reference numeral have an identical or similar configuration, and thus reference characters a, b, c, and d used for color discrimination may be omitted in the description below when color discrimination is not necessary.

The image forming apparatus 20 obtains image information using an image reading unit or via an image data output device, such as a computer, a word processor, a facsimile machine, decomposes the image information for each color, and then converts the image information into signals. The optical writing unit 70 includes light sources that emit laser beams 9a, 9b, 9c, and 9d, respectively, according to the signals.

In the image forming units, surfaces of the photoreceptors 6a, 6b, 6c, and 6d are uniformly charged, and then the laser beams 9a, 9b, 9c, and 9d are respectively deflected and directed onto the charged surfaces of the photoreceptors 6a, 6b, 6c, and 6d, forming electrostatic latent images thereon.

Subsequently, the latent images are developed with different color toners, sequentially transferred from the photoreceptors 6a, 6b, 6c, and 6d onto the intermediate transfer belt 21, and superimposed one on another thereon in a primary transfer operation. Then, the superimposed image is transferred therefrom onto a sheet that is fed from the sheet container 22 in synchronization therewith. After the image is fixed on the sheet, the sheet is discharged from the image forming apparatus 20.

After the image is transferred from each of the photoreceptors 6a, 6b, 6c, and 6d, the photoreceptor cleaner cleans the surface thereof, and then the discharger removes an electrical charge remaining thereon as preparation for subsequent image formation.

A digital color writing system according to the present embodiment is described below with reference to FIG. 2.

The digital color writing system includes the photoreceptors 6a, 6b, 6c, and 6d and the optical writing unit 70. As shown in FIG. 2, the optical writing unit 70 includes an optical housing 7, and an upper lid 8 configured to seal the housing 7. The optical housing 7 contains polygon mirrors 1a and 1b, serving as deflectors, shaped into regular-polygon columns, and formed as a single piece and connected by a column of reduced diameter; f-theta (θ) lenses 2a, 2b, 2c, and 2d; mirrors 3a, 3b, 3c, 3d, 4b, and 4c; and dustproof glass panes 5a, 5b, ac, and 5d that prevent dust, etc., from entering the optical writing unit 70. Each of the polygon mirrors 1a and 1b is used for two different colors.

Each side face of the polygon mirrors 1a and 1b is provided with a reflecting mirror, and the polygon mirrors 1a and 1b deflect the laser beams 9a, 9b, 9c, and 9d so as to scan the surfaces of the photoreceptors 6a, 6b, 6c, and 6d, respectively, while rotating at high velocity. The f-θ lenses 2a, 2b, 2c, and 2d respectively convert uniform angular movement of the laser beams (hereinafter also "scan beams") 9a, 9b, 9c, and 9d into uniform linear movement. Then, the laser beams 9a, 9b, 9c, and 9d are directed onto the surfaces of the photoreceptors 6a, 6b, 6c, and 6d via at least one of the mirrors 3a, 3b, 3c, 3d, 4b, and 4c, respectively.

Thus, in the optical writing unit 70, four optical paths are respectively formed by four optical systems each including the polygon mirror 1, the f-θ lens 2, the dustproof glass 5, and at least one of the mirrors 3 and 4, etc., corresponding to four different colors.

It is to be noted that, although the scan beams deflected by the polygon mirror 1 are reflected by one or two reflecting mirrors and then directed to the photoreceptors 6, respectively, in the description above, the present invention is not limited thereto. Further, one or more optical devices including a reflecting lens, another mirror, etc., can be provided between the f-θ lens 2 and the mirror 3.

Each optical system of the optical writing unit 70 further includes a curvature adjustment unit for correcting curvature of the scanning line (scanning line curvature) on the photoreceptors 6, which is described below with reference to FIG. 3.

It is to be noted that, because the curvature adjustment units for respective scanning lines have an identical or similar configuration, hereinafter reference characters a, b, c, and d are omitted in drawings the description below.

Figure 3:
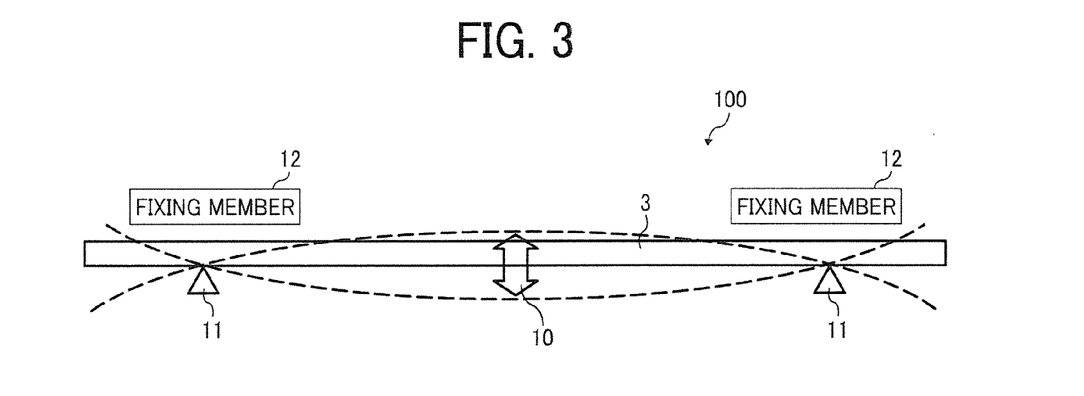
FIG. 3 schematically illustrates an example of a curvature adjustment unit according to an illustrative embodiment of the present invention.

FIG. 3 schematically illustrates a curvature adjustment unit 100, with some of its components omitted for simplicity.

Referring to FIG. 3, the a curvature adjustment unit 100 includes the mirror 3 serving as a reflecting mirror, a holder unit 30 (shown in FIG. 7) provided with supporters 11 that support the mirror 3, a pressure unit 10 (shown as a double-headed arrow in FIG. 3) configured to flexibly curve the mirror 3, and fixing members 12 fixing the mirror 3 to the holder unit 30 in a main scanning direction.

Figure 7:
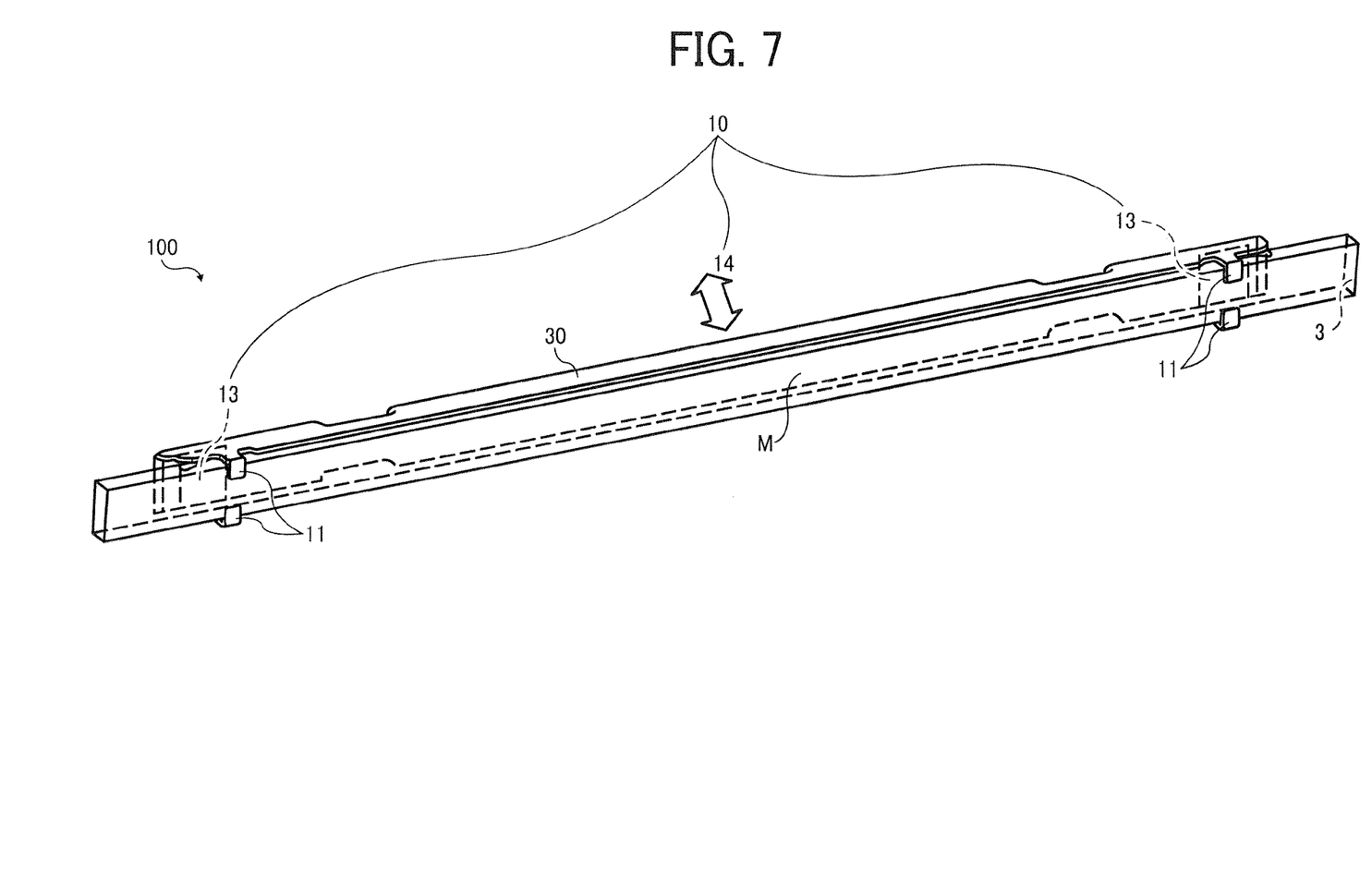
FIG. 7 is a perspective view illustrating an example of the curvature adjustment unit shown in FIG. 5A.

It is to be noted that, although FIG. 3 does not illustrate the holder unit 30 and indicates only the supporters 11 thereof by triangles for simplicity, the holder unit 30 can be laterally U-shaped as shown in FIG. 7, and the supporters 11 can be brackets or latch claws configured to engage the mirror 3 as an example.

Further, the pressure unit 10 can be a screw, a plate spring, etc., whose tip portion is pressed against a surface of the mirror 3 opposite a mirror surface (reflecting surface).

Alternatively, the pressure unit 10 can be provided on the mirror surface of the mirror 3. In this case, the supporters 11 are provided on the surface (hereinafter "non-mirror surface") of the mirror 3 opposite the mirror surface.

If the mirror 3 provided with the curvature adjustment unit 100 as described above receives an external shock, such as physical impact, vibration, an increase in temperature, etc., the relative positions of the mirror 3 and the supporters 11, and the mirror 3 and the holder unit 30 (shown in FIG. 7) might change. In such a case, the curvature of the multiple scanning lines that is preliminarily adjusted can change, causing color deviation.

In view of the foregoing, in the present embodiment, the fixing members 12 are provided in order to fix the relative positions of the mirror 3 and the holder unit 30, fixed to at least a portion of the mirror 3 and contacting the holder unit 30.

The fixing member 12 is described below in further detail.

The fixing member 12 can be a bar-shaped member, for example. When each fixing member 12 is bar-shaped, a position of the holder unit 30 relative to the mirror 3 can be fixed by inserting each fixing member 12 into a hole provided on the holder unit 30 (mirror holder) that corresponds to a diameter of the fixing member 12 and then fixing a tip portion of the fixing member 12 to the non-mirror surface of the mirror 3. When the fixing member 12 is thus bar-shaped, it is not necessary to limit the number and location thereof on the holder unit 30 in a longitudinal direction of the mirror 3 (main scanning direction) to a specific location or to specific examples.

Thus, configurations of the fixing member 12, such as cross-sectional shape, location, quantity etc., can be flexibly determined in relation to a layout of other components as long as the fixing member 12 can fix the position of the holder unit 30 relative to the mirror 3, which is an advantage. However, because the fixing member 12 should fix the positional relation therebetween by contacting both the holder unit 30 and the mirror 3, limitations are imposed on its length in a direction in which the holder unit 30 faces the mirror 3. That is, the length should be identical to or greater than a distance between the holder unit 30 and the mirror 3.

Alternatively, the fixing member 12 can be an adhesive member, in which case, needless to say, the adhesive should be out of at least an effective mirror area on the mirror surface of the mirror 3. In this case, adhesive can be saved by applying adhesive only to the supporters 11 provided on the mirror 3 or portions close to the supporters 11, and thus the cost of the fixing member 12 can be relatively low.

It is to be noted that a configuration and a location of the fixing member 12 is not limited to specific examples, such as those described above as long as the fixing member 12 can fix the position of the holder unit 30 relative to the mirror 3.

Figure 4:
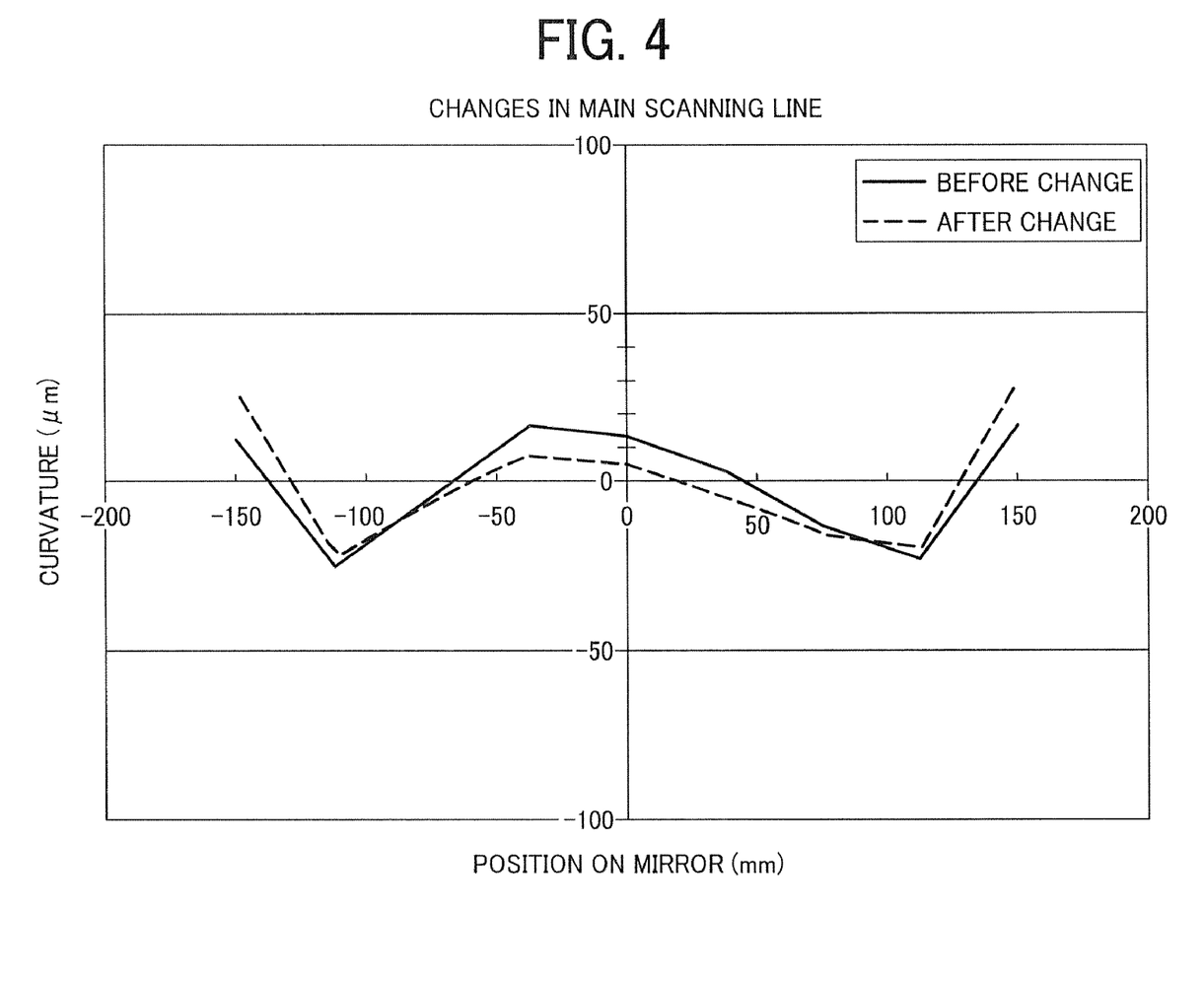
FIG. 4 is a graph illustrating an example of changes in scanning line curvature when a relative position between a holder unit and a reflecting mirror is changed by external impact.

FIG. 4 is a graph illustrating an example of changes in the scanning line curvature when the position of the holder unit 30 relative to the mirror 3 is changed by external impact such as physical impact, vibration, etc.

In the graph shown in FIG. 4, a vertical axis indicates an amount of the scanning line curvature in micrometers (μm). A horizontal axis indicates a position on the mirror 3 in the main scanning direction in millimeters (mm), and a center of the effective mirror area is set to 0. Further, an actual line and a dotted line respectively represent the scanning line curvatures before and after the external impact, and accordingly the position of the holder unit 30 relative to the mirror 3 is changed.

As shown in FIG. 4, a largest difference between the scanning line curvature before and after the position of the holder unit 30 relative to the mirror 3 is changed by the external impact, that is, the actual line and the dotted line, is more than 10 μm. Particularly, in full-color image forming, a deviation in the relative positions of the scanning lines corresponding to respective toner colors means color deviation, and a color deviation greater than about 20 μm can be caused.

In view of the foregoing, in the present embodiment, by fixing the position of the holder unit 30 relative to the mirror 3, differences between the scanning lines before and after external impact can be kept small, for example, about 3 μm or smaller.

The pressure unit 10 is described below in further detail with reference to FIGS. 5A through 6B. It is to be noted that, in FIGS. 5A through 6B, a reference character M represents the mirror surface of the mirror 3, and the fixing members 12 are omitted for simplicity.

Figure 5A:
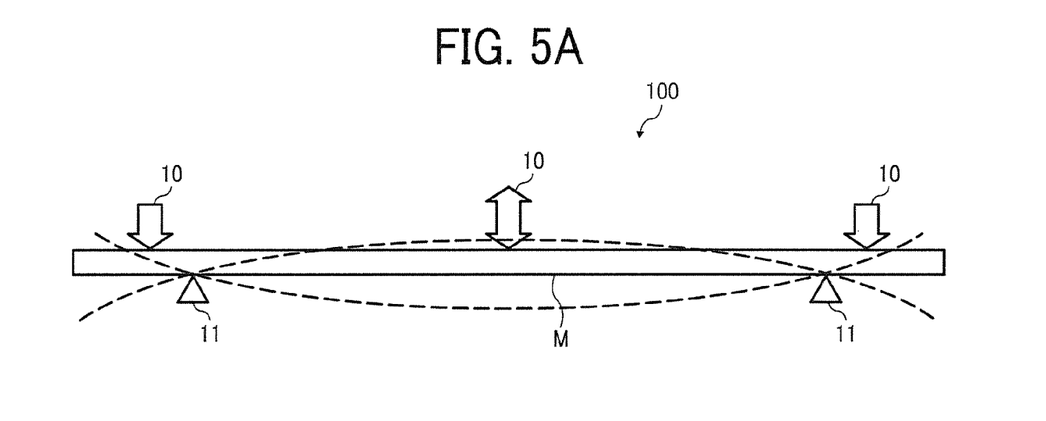
FIG. 5A is a schematic view illustrating curving the reflecting mirror, in which a pressure unit is provided on a non-mirror surface of the reflecting mirror.
Figure 6A:
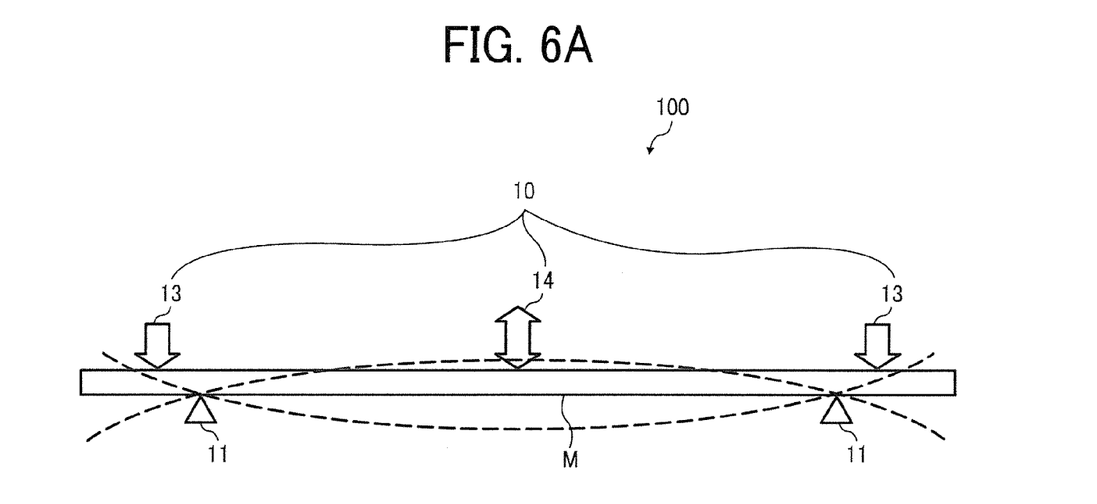
FIG. 6A schematically illustrates an example of the pressure unit shown in FIG. 5A.

In FIGS. 5A and 6A, the supporters 11 of the holder unit 30 (shown in FIG. 7) engage the mirror surface M of the mirror 3, and the pressure unit 10 is provided on the non-mirror surface thereof.

Figure 5B:
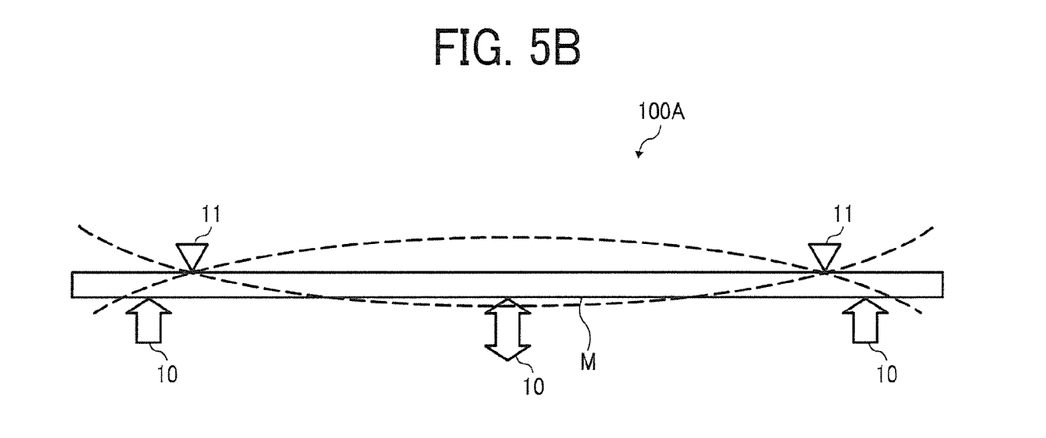
FIG. 5B is a schematic view illustrating curving the reflecting mirror, in which the pressure unit is provided on a mirror surface of the reflecting mirror.
Figure 6B:
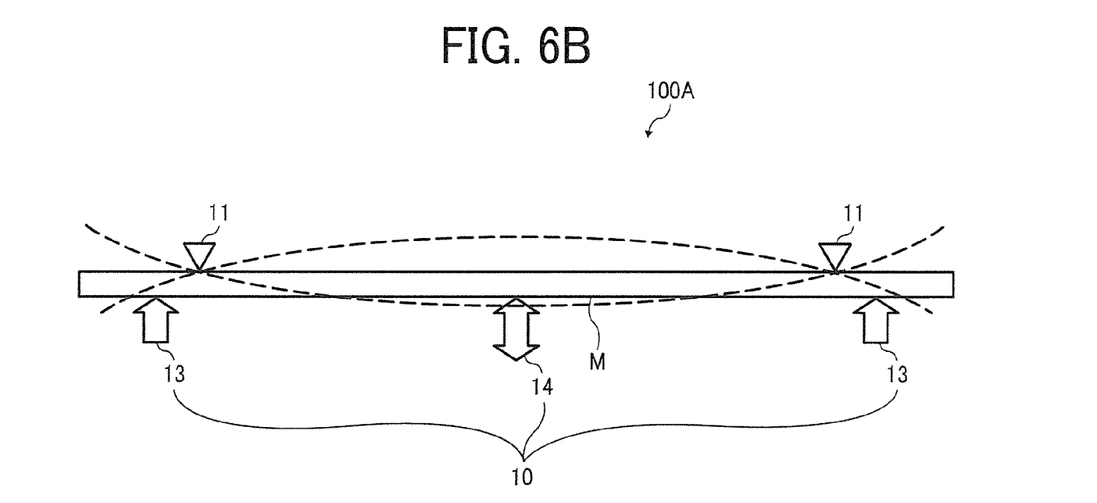
FIG. 6B schematically illustrates an example of the pressure unit shown in FIG. 5B.

By contrast, in a curvature adjustment unit 100A shown in FIGS. 5B and 6B, supporters 11 of a holder unit 30 engage the non-mirror surface of the mirror 3, and a pressure unit 10 is provided on the mirror surface M thereof. Other than that, the curvature adjustment unit 100A has a configuration identical or similar to that of the curvature adjustment unit 100.

In the configurations shown in FIGS. 6A and 6B, the pressure unit 10 includes first pressurizers 13 respectively provided on both end portions of the mirror 3 and a second pressurizer 14 provided on a center portion thereof in the longitudinal direction.

In FIG. 6A, the first pressurizers 13 and the second pressurizer 14 are provided on the non-mirror surface of the mirror 3. The first pressurizers 13 can be members having elastic force, such as plate springs, and press the mirror 3 against the supporters 11.

In an initial state, the first pressurizers 13 forcibly curve the mirror 3 in a normal direction of the mirror surface of the mirror 3 so that the center portion thereof bends upward in FIG. 6A. In this state, the second pressurizer 14 provided on the center portion of the mirror 3 can adjust this forcible curve in the opposite direction.

The second pressurizer 14 can be a screw, etc., for example, and adjust the amount of the curve (hereinafter also "deformation") of the mirror 3 by pushing the non-mirror surface of the mirror 3 with its tip portion. When the second pressurizer 14 is a screw, the center portion of the mirror 3 can be pressed so as to curve downward in FIG. 3 by tightening the second pressurizer 14, and an amount of the curvature of the mirror 3 can be reduced by loosing the second pressurizer 14. The second pressurizer 14 can further deform the mirror 3 to an extent that the forcible curve made by the first pressurizers is cancelled or the center portion thereof bends downward in FIG. 6A.

By contrast, in the curvature adjustment unit 101A shown in FIG. 6B, the pressure unit 10 is provided on the mirror surface M of the mirror 3 as described above. In the curvature adjustment unit 10A, the first pressurizers 13 press against the mirror 3 so as to curve a center portion thereof downward in the initial state.

In the curvature adjustment unit 10A, although the first pressurizers 13 can be members having elastic force, such as plate springs, as described above, the second pressurizer 14 is not a screw, etc. Instead, the second pressurizer 14 can be an engagement claw, etc., that can push portions outside of the effective mirror area of the mirror surface M of the mirror 3 so as not to affect the scanning light reflected by the mirror 3.

Thus, in the curvature adjustment unit 100A as well, the forcible curve of the mirror 3 can be adjusted by moving the second pressurizer 14 that is an engagement claw upward and downward in FIG. 6B. However, the configuration shown in FIG. 6A has fewer limitation regarding the shape, position, etc., of the first pressurizer 14, and is more advantageous than the configuration shown in FIG. 6B. For example, the configuration shown in FIG. 6B can be adopted when that shown in FIG. 6A is not adoptable due to the layout of other components.

Now, a configuration of the curvature adjustment unit 100, which is schematically shown in FIGS. 3 and 5A through 6B, is described below with reference to FIG. 7.

In the configuration shown in FIG. 7, the supporters 11 are brackets provided on the lateral U-shaped holder unit 30 and engage the mirror surface M of the mirror 3 opposite the side on which the pressure unit 10 is provided. Each of the supporters 11 is located between the first pressurizer 13 and the second pressurizer 14.

The first pressurizers 13, which are indicated as dotted rectangles In FIG. 7, are plate springs, etc., for example. The mirror 3 is pressed against the supporters 11 by repulsive forces of the first pressurizers 13 provided on both end portions of the mirror 3 in the longitudinal direction, and thus the mirror 3 is forcibly curved to a predetermined or given extent, and the center portion thereof projects to the non-mirror surface side in the initial state. In this state, the amount of the curvature can be adjusted by pushing the center portion of the mirror 3 with the second pressurizer 14 that is a screw, etc., for example.

Figure 2:
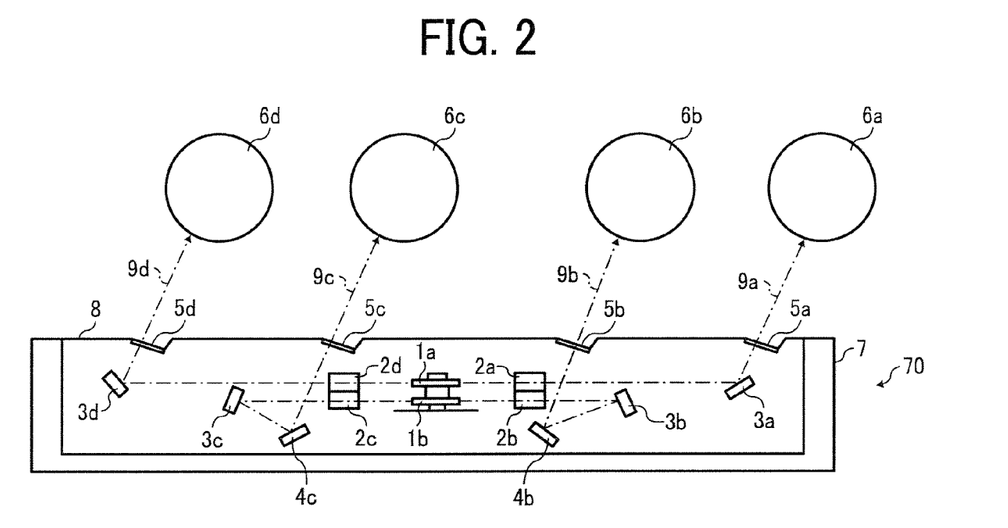
FIG. 2 is a schematic cross-sectional view illustrating a configuration of a digital optical writing system according to an illustrative embodiment of the present invention.
Figure 8:
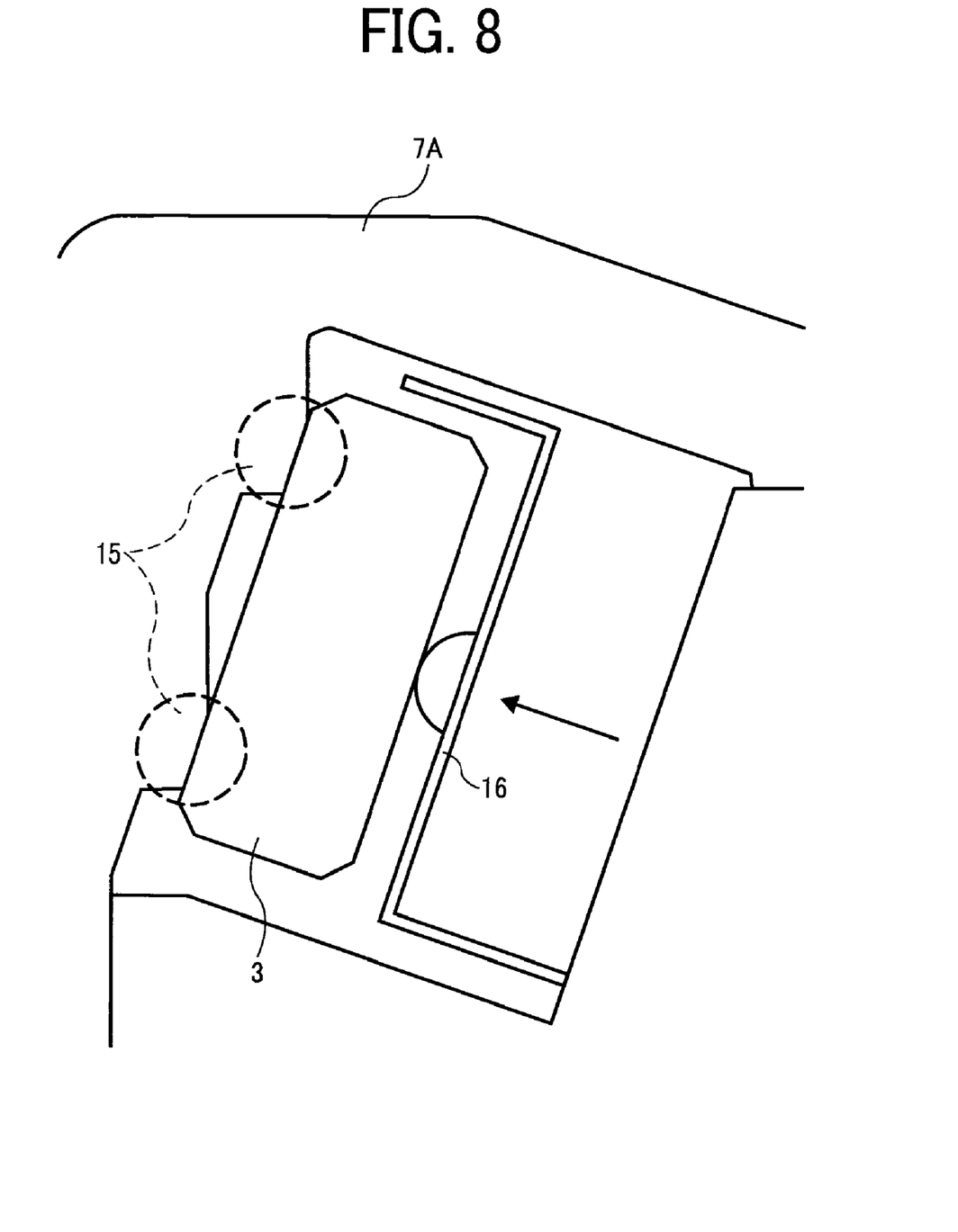
FIG. 8 is a cross-sectional view illustrating a configuration in which supporters are integrated into a housing of the optical writing unit shown in FIG. 2.

It is to be noted that the supporters 11 can be integrated into the housing 7 of the optical writing unit 70 shown in FIG. 2, an shown in FIG. 8.

In FIG. 8, a housing 7A includes two projections 15, serving as supporters for supporting the mirror 3, that project toward the mirror 3. A plate spring 16 is provided on a back side (non-mirror surface) of the mirror 3 and presses the mirror 3 against the projections 15, supporting the mirror 3. Alternatively, the mirror 3 can be pressed against the projections 15 by a metal plate instead of the plate spring 16, and the mirror 3 can be bonded to the housing 7 via the metal plate.

When the supporters (projections 15) are integrated into the housing 7A as shown in FIG. 8, fixing the mirror 3 to the supporters 15 in the main scanning direction can achieve a result similar to that achieved in the configuration in which the mirror 3 is fixed to the housing 7 in the main scanning direction. Further, because brackets, etc., can be saved in this configuration, the cost of the curvature adjustment unit can be reduced.

By contrast, separating the holder unit 30 and the supporters 11 from the housing 7 provides the following advantages: When the holder unit 30 and the supporters 11 such as brackets are configured as a separate unit formed with a material whose rigidity is greater than that of the mirror 3, the relative positions of the supporters 11 do not change, and thus the adjusted curvature of the mirror 3 can be maintained by controlling the deviation between the mirror 3 and the supporters 11 in the main scanning direction. Further, when the holder unit 30 and the supporters 11 are separated from the housing 7, the curvature adjustment unit can be an independent adjustment unit, and thus inclination of the scanning line, etc., can be adjusted relatively easily.

The fixing members 12 are described below in further detail.

Figure 9:
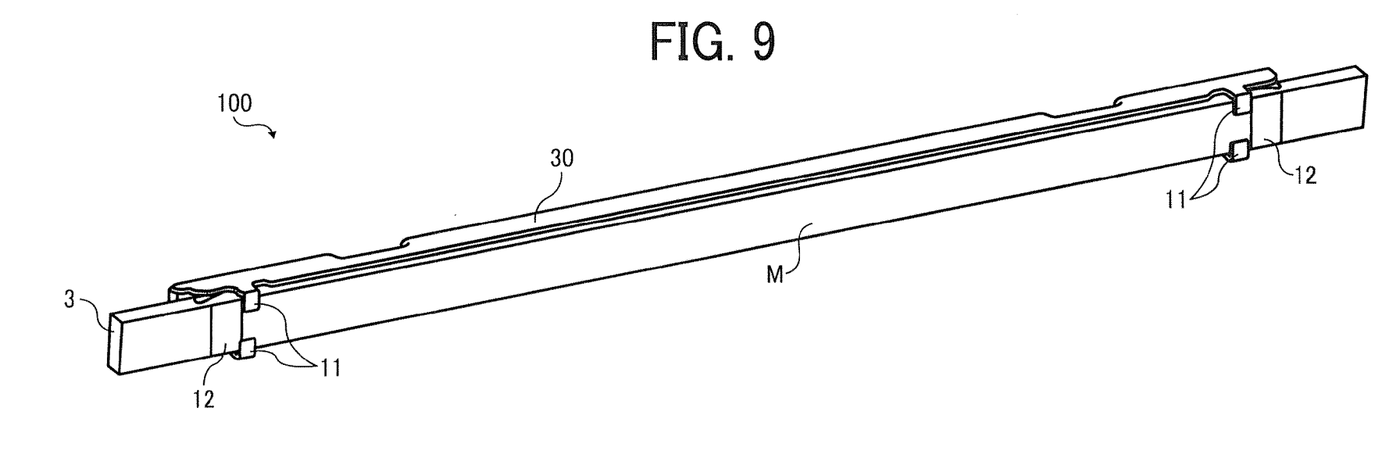
FIG. 9 is a perspective view illustrating an example of a fixing member.

FIG. 9 illustrates a configuration of the fixing members 12 according to the present embodiment.

In the configuration shown in FIG. 9, each fixing member 12 is provided on the mirror surface of the mirror 3 outside each supporter 11, which is disposed between the first pressurizer 13 and the second pressurizer 14 shown in FIG. 7, in the longitudinal direction.

The fixing members 12 shown in FIG. 9 are plates, for example, and the relative positions of the mirror 3 and the supporters 11, and the mirror 3 and the holder unit 30 can be fixed by fixing the fixing members 12 to the mirror 3 where the fixing members 12 contact the supporters 11, respectively.

It is to be noted that, although each fixing member 12 can be fixed to the mirror 3 so that there is no gap between the fixing member 12 and the supporter 11 in theory, in practice, a gap or error tolerable in designing the curvature adjustment unit, such as a gap of less than about 0.1 mm, for example, can be allowed.

Figure 10:
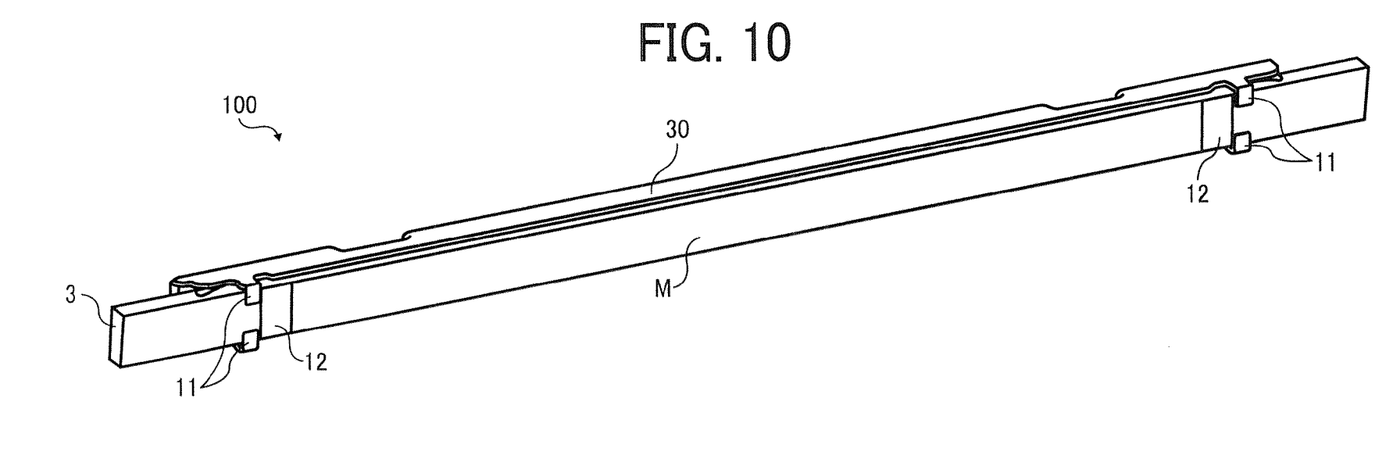
FIG. 10 is a perspective view illustrating another example of the fixing member.

When the layout makes it difficult to dispose each fixing member 12 outside the supporter 11 in the longitudinal direction of the mirror 3 as shown in FIG. 9, for example, because the fixing member 11 interferes with some component, the mirror 3 does not project outside the supporter 11, etc., each fixing member 12 can be disposed inside the supporter 11 as shown in FIG. 10. The configuration shown in FIG. 10 can achieve a result similar to that achieved by the configuration shown in FIG. 9.

To fix the fixing member 12 to the mirror 3, when double-sided adhesive tape, or adhesive, for example, is used, the positional relation in the scanning direction can be fixed relatively easily at a relatively low cost. If expected impact is relatively large, the fixing member 12 can be securely fixed to the mirror 3 by increasing an adhesion area thereof.

Variations of the fixing member 12 according to the present invention are described below with reference to FIGS. 11 and 12.

Figure 11:
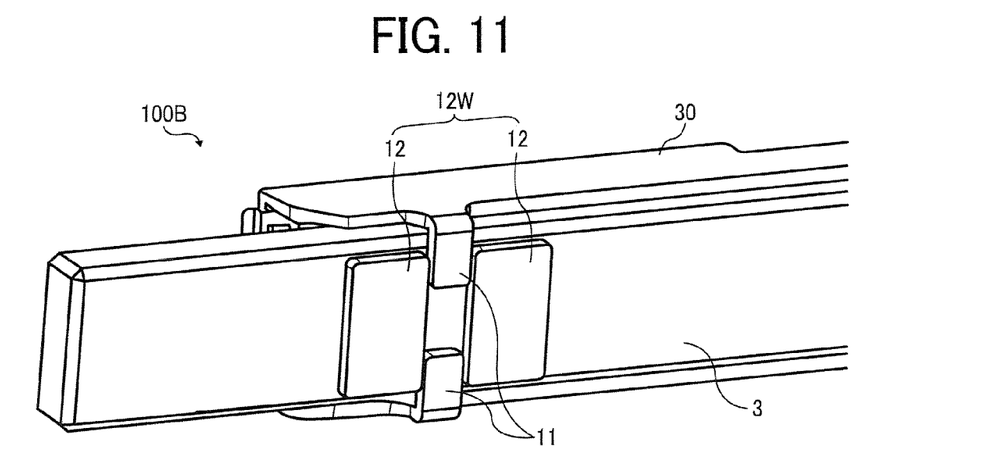
FIG. 11 is an enlarged view illustrating another example of the fixing member.
Figure 12:
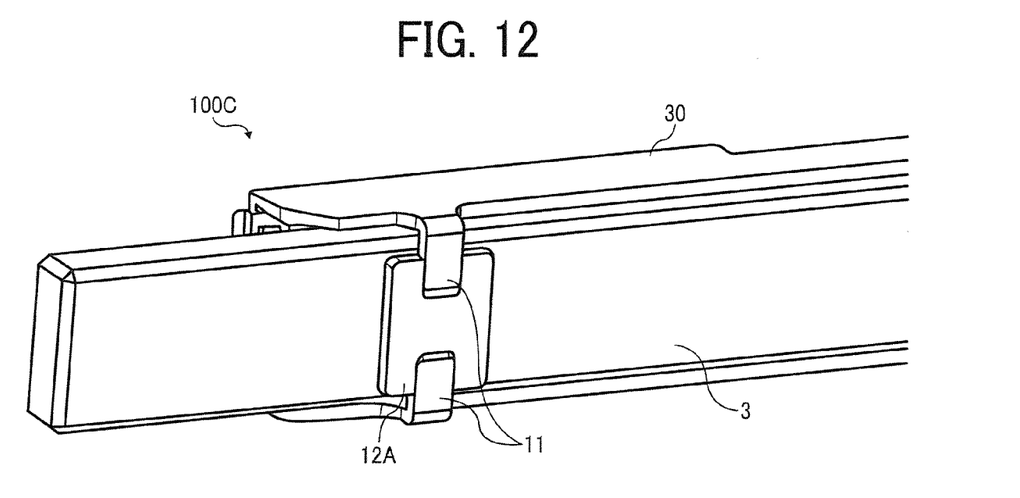
FIG. 12 is an enlarged view illustrating another example of the fixing member.

FIGS. 11 and 12 are enlarged views respectively illustrating a curvature adjustment unit 100B and a curvature adjustment unit 100C. In each of FIGS. 11 and 12, supporters 11 of a holder unit 30 are plates disposed in both end portions of a mirror 3, respectively.

In the curvature adjustment unit 100B shown in FIG. 11, a fixing unit 12W includes two fixing members 12, and the fixing members 12 are respectively disposed on both sides of either of the supporters 11 in the longitudinal direction of the mirror 3.

By contrast, in the curvature adjustment unit 100C shown in FIG. 12, a fixing member 12A includes two portions respectively disposed on both sides of the supporters 12, and sandwiches the supporter 11 therebetween. More specifically, the fixing member 12A is a H-shaped plate that includes portions recessed in a vertical direction in FIG. 12, and the supporter 11 engages the recessed portions.

In the configurations shown in FIGS. 11 and 12, the relative positions of the mirror 3 and the holder unit 30 can be fixed by fixing only a single supporter 11 differently from the configurations shown in FIGS. 9 and 10, and thus the number of the components can be reduced, reducing the cost.

It is to be noted that, alternatively, each of the fixing unit 12W shown in FIG. 11 and the fixing member 12A shown in FIG. 12 can be adopted to fix each of the supporters 11 provided in end portions of the mirror 3. When both the supporters 11 provided in both end portions of the mirror 3 are fixed using two fixing members as shown in FIGS. 9 and 10, positional variations in attaching the fixing members to the mirror 3 cause variations or error in the relative positions of the holder unit 30 and the mirror 3. By contrast, when only a single supporter 11 is fixed by the fixing member as in the configurations shown in FIGS. 11 and 12, only tolerances in the engagement between the supporter 11 and the fixing member cause the variation or error, and thus the variation or error can be reduced.

It is to be noted that, although each fixing member 12 is provided on the mirror surface M of the mirror 3 in FIGS. 9 and 10, the present invention is not limited thereto. Alternatively, the fixing member 12 can be attached to a side surface of the mirror 3, for example. Alternatively, when each supporter 11 is provided on the non-mirror surface of the mirror 3 as shown in FIGS. 5B and 6B, each fixing member 12 can be provided on the non-mirror surface as well.

Moreover, although a similar effect can be attained when the fixing member 12 is disposed within the effective mirror area (for example, an evaporation area) in the longitudinal direction of the mirror 3, in this case, the mirror 3 should have a sufficient width in a sub-scanning direction in order not to affect the scanning line that is deflected and directed by the polygon mirror 1, etc. Accordingly, the cost is relatively high. In addition, when the fixing member 12 is disposed in the effective mirror area, an evaporation surface of the effective mirror area might be damaged, or when the fixing member 12 is adhesive, the adhesive might drip onto the effective mirror area.

In view of the foregoing, it is preferred that the fixing member 12 is disposed outside the effective mirror area of the mirror 3.

Figure 13:
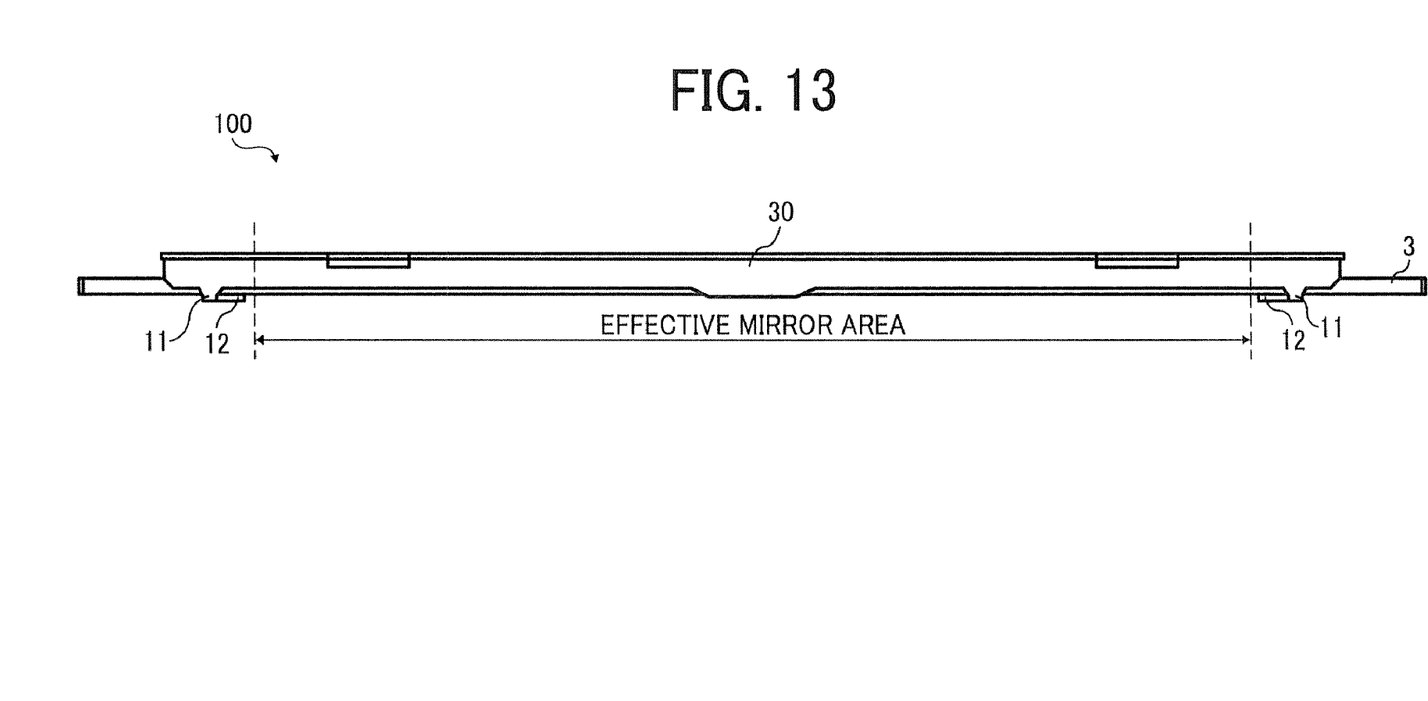
FIG. 13 illustrates an example in which the fixing member is disposed outside an effective mirror area of the reflecting mirror.

FIG. 13 illustrates a configuration in which each fixing member 12 is disposed inside each supporter 11 outside the effective mirror area in the longitudinal direction of the mirror 3.

It is to be noted that, as in the embodiments described above, when the optical writing unit is used in a multicolor image forming apparatus and is provided with multiple optical paths whose number is N, for example, the optical writing unit can include the identical number (N) of multiple curvature adjustment units according to the above-described embodiments. In other words, each optical path can be provided with its own curvature adjustment unit.

Alternatively, to reduce the components and the cost of the optical writing unit, the number of the curvature adjustment units can be N−1. More specifically, one of the optical paths can serve as a reference optical path that is not provided with the curvature adjustment unit. Then, each of the rest (N−1) are provided with a curvature adjustment unit that adjusts the scanning line curvature of the corresponding optical path with respect to the reference optical path. Thus, when the number of the curvature adjustment units is N−1, even if some external impact causes the reflecting mirror of the reference optical path to be deviated in the main scanning direction, because that reflecting mirror is not forcibly deformed by the curvature adjustment unit, the scanning line curvature of the reference optical path, which is used as a reference curvature, does not change. Thus, color deviation can be prevented or reduced when the scanning line curvature of the rest of the optical paths is maintained.

It is to be noted that, although the description above concerns a multicolor image forming apparatus, the present invention can be applied to a monochrome image forming apparatus so as to prevent or reduce positional deviation of images.

Thus, by providing the curvature adjustment unit according to above-described embodiments to the optical writing unit of either a monochrome image forming apparatus or a multicolor image forming apparatus, the adjustment of the scanning line curvature can be maintained at a relatively low cost even if the optical writing unit receives external impact. Accordingly, an image forming apparatus that can produce high-quality images can be attained at a relatively low cost.

Further, according to the above-described embodiments of the present invention, the fixing member can be relatively easily attached to the reflecting mirror whose curvature is preliminarily adjusted at a relatively low cost, and thus the color deviation and positional deviation of images can be prevented or reduced using a relatively simple mechanism.

Moreover, the curvature adjustment unit according to the embodiments of the present invention can be applied to an image forming apparatus that is already installed in a user's site, and thus the color deviation and positional deviation of images, or at least degradation thereof, can be prevented or reduced relatively easily and at a relatively low cost.

Numerous additional modifications and variations are possible in light of the above teachings. It is therefore to be understood that, within the scope of the appended claims, the disclosure of this patent specification may be practiced otherwise than as specifically described herein.

What is claimed is:

1. An optical scanner provided with at least one optical path through which an optical beam emitted from a light source is directed onto a surface of an object for forming an image thereon, the optical scanner including:
a deflector configured to deflect the optical beam; and
a curvature adjustment unit comprising:
a reflecting mirror configured to reflect the optical beam deflected by the deflector in a predetermined direction;
a holder unit configured to hold the reflecting mirror and including at least one supporter that engages the reflecting mirror;
a pressure unit configured to flexibly deform the reflecting mirror in a normal direction relative to a reflecting surface of the reflecting mirror; and
a fixing member fixed to at least a portion of the reflecting mirror, configured to fix a position of the reflecting mirror relative to the holder unit in a main scanning direction by contacting at least a portion of the holder unit including the supporter,
wherein the pressure unit of the curvature adjustment unit includes a first pressurizer configured to forcibly curve the reflecting mirror in the normal direction relative to the reflecting surface of the reflecting mirror by pushing the reflecting mirror in one direction and a second pressurizer configured to deform the reflecting mirror in a direction opposite the direction of the forcible curve caused by the first pressurizer, the pressure unit pushes one of the reflecting surface of the reflecting mirror and a non-mirror surface of the reflecting mirror opposite the reflecting surface, the supporter is disposed on the other of the non-mirror surface of the reflecting mirror and the reflecting surface of the reflecting mirror and between the first pressurizer and the second pressurizer, and the fixing member is disposed outside the supporter in a longitudinal direction of the reflecting mirror.

2. The optical scanner according to claim 1, wherein the fixing member is disposed inside the supporter in a longitudinal direction of the reflecting mirror.

3. The optical scanner according to claim 1, wherein the fixing member is disposed on both sides of the supporter in a longitudinal direction of the reflecting mirror.

4. The optical scanner according to claim 1, wherein the fixing member is configured to sandwich the supporter in a longitudinal direction of the reflecting mirror.

5. The optical scanner according to claim 1, wherein the fixing member is a plate bonded to the reflecting mirror with adhesive.

6. The optical scanner according to claim 1, wherein the fixing member is a plate bonded to the reflecting mirror with double-sided adhesive tape.

7. The optical scanner according to claim 1, wherein, when multiple optical paths are used, one of the multiple optical paths is not provided with the curvature adjustment unit.

8. An image forming apparatus comprising:

at least one image carrier on which a latent image is formed; and an optical scanner including at least one optical path each provided with a deflector configured to deflect an optical beam emitted from a light source and a curvature adjustment unit, the curvature adjustment unit comprising:

a reflecting mirror configured to reflect the optical beam deflected by the deflector in a predetermined direction;

a holder unit configured to hold the reflecting mirror and including at least one supporter that engages the reflecting mirror;

a pressure unit configured to flexibly deform the reflecting mirror in a normal direction relative to a reflecting surface of the reflecting mirror; and a fixing member fixed to at least a portion of the reflecting mirror, configured to fix a position of the reflecting mirror relative to the holder unit in a main scanning direction by contacting at least a portion of the holder unit including the supporter, wherein the pressure unit of the curvature adjustment unit includes a first pressurizer configured to forcibly curve the reflecting mirror in the normal direction relative to the reflecting surface of the reflecting mirror by pushing the reflecting mirror in one direction and a second pressurizer configured to deform the reflecting mirror in a direction opposite the direction of the forcible curve caused by the first pressurizer, the pressure unit pushes one of the reflecting surface of the reflecting mirror and a non-mirror surface of the reflecting mirror opposite the reflecting surface, the supporter is disposed on the other of the non-mirror surface of the reflecting mirror and the reflecting surface of the reflecting mirror and between the first pressurizer and the second pressurizer, and the fixing member is disposed outside the supporter in a longitudinal direction of the reflecting mirror.

9. A curvature adjustment unit used in an optical scanner for forming an image on a surface of an object with an optical beam emitted from a light source, the curvature adjustment unit comprising:

a reflecting mirror configured to reflect the optical beam deflected by a deflector in a predetermined direction;

a holder unit configured to hold the reflecting mirror and including at least one supporter that engages the reflecting mirror;

a pressure unit configured to flexibly deform the reflecting mirror in a normal direction relative to a reflecting surface of the reflecting mirror; and a fixing member fixed to at least a portion of the reflecting mirror, configured to fix a position of the reflecting mirror relative to the holder unit in a main scanning direction by contacting at least a portion of the holder unit including the supporter, wherein the pressure unit of the curvature adjustment unit includes a first pressurizer configured to forcibly curve the reflecting mirror in the normal direction relative to the reflecting surface of the reflecting mirror by pushing the reflecting mirror in one direction and a second pressurizer configured to deform the reflecting mirror in a direction opposite the direction of the forcible curve caused by the first pressurizer, the pressure unit pushes one of the reflecting surface of the reflecting mirror and a non-mirror surface of the reflecting mirror opposite the reflecting surface, the supporter is disposed on the other of the non-mirror surface of the reflecting mirror and the reflecting surface of the reflecting mirror and between the first pressurizer and the second pressurizer, and the fixing member is disposed outside the supporter in a longitudinal direction of the reflecting mirror.

\* \* \* \* \*